(12) United States Patent
Yamawaki et al.

(10) Patent No.: US 7,057,632 B2
(45) Date of Patent: Jun. 6, 2006

(54) OPTICAL SCANNING APPARATUS, IMAGE FORMING APPARATUS, AND METHODS OF PERFORMING OPTICAL SCANNING USING OPTICAL SCANNING APPARATUS AND IMAGE FORMING APPARATUS

(75) Inventors: Takeshi Yamawaki, Tokyo (JP);
Makoto Fujimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/729,279

(22) Filed: Dec. 5, 2000

(65) Prior Publication Data

US 2001/0012043 A1    Aug. 9, 2001

(30) Foreign Application Priority Data

Dec. 10, 1999   (JP) ........................................... 11-351516

(51) Int. Cl.
*B41J 2/385*       (2006.01)
*G03G 13/04*     (2006.01)

(52) U.S. Cl. ...................................................... 347/129
(58) Field of Classification Search ................. 347/134, 347/138, 137, 129, 225, 242, 244–246, 256
See application file for complete search history.

(56) References Cited

U.S. PATENT DOCUMENTS

| | | | | |
|---|---|---|---|---|
| 4,355,859 A | * | 10/1982 | Herloski et al. | |
| 5,047,800 A | * | 9/1991 | Fukumoto et al. | |
| 5,587,094 A | * | 12/1996 | Yoshida et al. | 347/256 X |
| 5,767,962 A | * | 6/1998 | Suzuki et al. | |
| 5,774,248 A | * | 6/1998 | Komatsu | 347/242 X |
| 5,949,526 A | * | 9/1999 | Koguchi | |
| 6,154,247 A | * | 11/2000 | Marino et al. | 347/256 |
| 6,281,918 B1 | * | 8/2001 | Burdick et al. | 347/138 |

FOREIGN PATENT DOCUMENTS

| | | | | |
|---|---|---|---|---|
| EP | 50425 A2 | * | 4/1982 | |
| JP | 02219012 A | * | 8/1990 | |
| JP | 6-230300 | * | 8/1994 | |
| JP | 8-304726 | * | 11/1996 | |
| JP | 9-96769 | | 4/1997 | |
| JP | 11-14923 | | 1/1999 | |
| JP | 11064759 A | * | 3/1999 | |
| JP | 11264952 A | * | 9/1999 | |

OTHER PUBLICATIONS

"Webster's Ninth New Collegiate Dictionary", 1990, Merriam–Webster Inc., p. 1086.*

* cited by examiner

*Primary Examiner*—Susan Lee
(74) *Attorney, Agent, or Firm*—Fitzpatrick, Cella, Harper & Scinto

(57) ABSTRACT

An optical scanning apparatus includes a laser unit formed by integrating a semiconductor laser and collimator lens, an incident optical system for making a light beam emerging from the laser unit strike an optical deflector while keeping the light beam wider than the width of a deflecting surface of the optical deflector in the main scanning direction, and an imaging optical system for forming the light beam reflected/deflected by the optical deflector into an image on a scanned surface. The laser unit is shifted by a shift adjusting means in a predetermined direction with respect to the optical axis of the incident optical system so as to make an illuminance distribution of scanning lines on the scanned surface become substantially symmetrical about the scanning central axis.

42 Claims, 4 Drawing Sheets

OPTICAL SCANNING APPARATUS, IMAGE FORMING APPARATUS, AND METHODS OF PERFORMING OPTICAL SCANNING USING OPTICAL SCANNING APPARATUS AND IMAGE FORMING APPARATUS

BACKGROUND OF THE INVENTION

1. Field of the Invention

The present invention relates to an optical scanning apparatus and image forming apparatus and, more particularly, to an optical scanning apparatus which uses an OFS (Over Field Scanner) optical system designed to receive a light beam emitted from a light source means within a range wider than the width of a deflecting surface in the main scanning direction and optically scan a photosensitive member and is suitably used for an image forming apparatus such as a digital copying machine or laser beam printer, and methods of manufacturing the optical scanning apparatus and image forming apparatus.

2. Related Background Art

Recently, as digital copying machines, LBPs (Laser Beam Printers), and the like become faster in operation, an OFS optical system which can perform scanning with an increased number of deflecting surfaces (reflecting surfaces) of a polygon mirror serving as an optical deflector, a multi-beam scanning optical apparatus based on a scheme of simultaneously forming a plurality of scanning lines with an increased number of light sources (emission points), and the like have been proposed. In addition, a faster apparatus can be implemented by combining the above two types of techniques.

In an OFS optical system, part of an incident light beam having a Gaussian intensity distribution is cut by a deflecting surface of a polygon mirror to form a scanning light beam (reflected light beam). For this reason, the scanning light beam has an intensity distribution, which in turn forms a scanning line illuminance distribution on a scanned surface, resulting in the density irregularity of an image.

Conventionally, therefore, as disclosed in Japanese Laid-Open Patent Application No. 11-14923, an ND filter with gradation serving as a light amount adjusting means for adjusting the exposure on a scanned surface is disposed between a light source and an optical deflector and is designed to be movable in the gradation direction and rotatable in a plane including the filter surface, thereby reducing the intensity distribution of a scanning beam after deflection.

Japanese Laid-Open Patent Application No. 9-96769 discloses a technique of correcting the asymmetry of a light amount distribution by shifting or tilting a light source in the main scanning direction with respect to a collimator lens.

In this method, the light source is shifted from the optical axis of the collimator lens to cause a parallel light beam emerging from the collimator lens to emerge obliquely with respect to the optical axis of the collimator lens. With this operation, the light beam incident on a polygon surface is shifted in the main scanning direction, thereby making adjustment such that the center of the intensity distribution of the light beam coincides with the center of the polygon surface.

In this method, however, since the light source is moved relative to the collimator lens, a field angle is set, and a focus error occurs at the same time. The influences of these phenomena are enhanced as the focal length of the collimator lens is decreased to increase the use efficiency of light from the light source.

In general, the focus adjustment sensitivity in the main scanning direction is proportional to the square of the lateral magnification of the overall system, and the focus adjustment precision of the light source and collimator lens is about 5 μm. To prevent a focus error in the light source, a high mechanical precision is required, resulting in an increase in cost.

In addition, since the collimator lens and light sources are discrete components, if the light source fails, the optical scanning apparatus must be replaced, requiring a high cost in terms of market serviceability. If the light source and collimator lens are integrated into one unit, a deterioration in this light source can be coped with by replacing the unit with another.

Although optimal filters for the design center values of an optical system can be prepared, the influences of assembly tolerance, variations in parts, and the like are too large to be neglected. If an assembled semiconductor laser chip is tilted in the main scanning direction with respect to the optical axis, in particular, the intensity center of a substantially parallel light beam emerging from the collimator lens shifts from the optical axis center. As a consequence, the intensity distribution of an incident light beam cut by the polygon mirror becomes asymmetrical. In an extreme case, the intensity peak of a scanning line formed on a scanned surface is located outside the effective scanning range, and reaches a value twice or more the initial value upon tilting of the intensity distribution. In such a case, no stable effect can be expected even with measures such as a filter.

SUMMARY OF THE INVENTION

It is an object of the present invention to provide an optical scanning apparatus, in which the laser unit is configured to be shifted by the shift adjusting means in a predetermined direction with respect to the optical axis of the incident optical system or/and the tilt angle of the semiconductor laser chip is set to fall within an allowable range so as to make an illuminance distribution, obtained when a scanned surface is scanned with scanning lines, almost symmetrical about the scanning center axis so that the asymmetry of an illuminance distribution, obtained when the scanned surface is scanned with scanning lins, due to variations in components, assembly errors, and the like can be reduced.

According to an aspect of the present invention, there is provided an optical scanning apparatus comprising a laser unit in which a light source and collimator lens are integrated, an incident optical system for making a light beam emerging from the laser unit strike an optical deflector while keeping the light beam wider than a width of a deflecting surface of the optical deflector in a main scanning direction, and an imaging optical system for forming the light beam reflected/deflected by the optical deflector into an image on a scanned surface, wherein the laser unit is adapted to be shifted by shift adjusting means in a predetermined direction with respect to an optical axis of the incident optical system so as to make an illuminance distribution of scanning lines on the scanned surface become substantially symmetrical about a scanning central axis.

According to another aspect of the present invention, "substantially symmetrical" indicates that an illuminance distribution on the scanned surface falls within ±5% with respect to the axis in an effective scanning range.

According to still another aspect of the present invention, the predetermined direction is the main scanning direction or/and a sub-scanning direction.

According to still another aspect of the present invention, the light beam emerging from the laser unit is a substantially parallel light beam.

According to still another aspect of the present invention, when the optical axes of the incident optical system and imaging optical system are projected on a main scanning cross-section, the optical axes substantially coincide with each other.

According to still another aspect of the present invention, the light beam emerging from the incident optical system is obliquely incident on the deflecting surface of the optical deflector in a sub-scanning cross-section.

According to still another aspect of the present invention, the light beam emerging from the incident optical system is obliquely incident on the deflecting surface of the optical deflector in a main scanning cross-section.

According to still another aspect of the present invention, the incident optical system is arranged in a main scanning cross-section based on the optical deflector.

According to still another aspect of the present invention, the incident optical system comprises a stop plate, and the laser unit is shifted by the shift adjusting means in a predetermined direction with respect to the optical axis of the incident optical system such that a ratio of intensities of two light beams obtained by splitting a light beam passing through the stop plate in two in the main scanning direction at a stop center becomes not more than 10%.

According to still another aspect of the present invention, a tilt angle of the light source in the main scanning direction is set to not more than ±2.5° with respect to the optical axis of the collimator lens.

According to still another aspect of the present invention, the laser unit is shifted in advance in the main scanning direction with respect to the optical axis of the incident optical system by an amount corresponding to an incident angle at which the light beam emerging from the incident optical system is obliquely incident on the deflecting surface of the optical deflector in a main scanning cross-section.

According to still another aspect of the present invention, there is provided an image forming apparatus comprising the optical scanning apparatus described above, a photosensitive member placed on the scanned surface, a developing unit for developing an electrostatic latent image formed on the photosensitive member by a light beam scanned by the optical scanning apparatus into a toner image, a transfer unit for transferring the developed toner image onto a transfer medium, and a fixing unit for fixing the transferred toner image on the transfer medium.

According to still another aspect of the present invention, there is provided an image forming apparatus comprising the optical scanning apparatus described above, and a controller for converting code data input from an external device into an image signal, and inputting the signal to the optical scanning apparatus.

According to still another aspect of the present invention, there is provided a method of manufacturing an optical scanning apparatus including a laser unit formed by integrating a light source and collimator lens, an incident optical system for making a light beam emerging from the laser unit strike an optical deflector while keeping the light beam wider than a width of a deflecting surface of the optical deflector in a main scanning direction, and an imaging optical system for forming the light beam reflected/deflected by the optical deflector into an image on a scanned surface, comprising the step of causing shift adjusting means to shift the laser unit in a predetermined direction with respect to the optical axis of the incident optical system so as to make an illuminance distribution of scanning lines on the scanned surface become substantially symmetrical about a scanning central axis.

According to still another aspect of the present invention, the predetermined direction is the main scanning direction or/and a sub-scanning direction.

According to still another aspect of the present invention, there is provided a method of manufacturing an image forming apparatus by forming the optical scanning apparatus manufactured by the method described above, and a controller for converting code data input from an external device into an image signal and inputting the signal to the optical scanning apparatus.

According to still another aspect of the present invention, there is provided an optical scanning apparatus comprising a laser unit having a laser source and an optical element configured to emit a substanstially parallel beam of light, an incident optical system arranged to direct the light beam emerging from the laser unit to strike an optical deflector while maintaining a width of the light beam wider than a width of a deflecting surface of the optical deflector in a main scanning direction; and an imaging optical system for forming the light beam deflected by the optical deflector into an image on a scanned surface, wherein the laser unit is adapted to be moved in the main scanning direction without changing a direction of an optical axis of the incident optical system so as to make an illuminance distribution of scanning lines on the scanned surface become substantially symmetrical about a scanning central axis.

According to still another aspect of the invention, there is provided a method for performing optical scanning using an optical scanning apparatus including a laser unit having a laser source and an optical element configured to emit a substantially parallel beam of light, an incident optical system arranged to direct the light beam emerging from the laser unit to strike an optical deflector while maintaining a width of the light beam wider than a width of a deflecting surface of the optical deflector in a main scanning direction, and an imaging optical system for forming the light beam deflected by the optical deflector into an image on a scanned surface, the method comprising the step of moving the laser unit in the main scanning direction without changing a direction of an optical axis of the incident optical system so as to make an illuminance distribution of scanning lines on the scanned surface become substantially symmetrical about a scanning central axis.

DETAILED DESCRIPTION OF THE PREFERRED EMBODIMENTS

Figure 1:
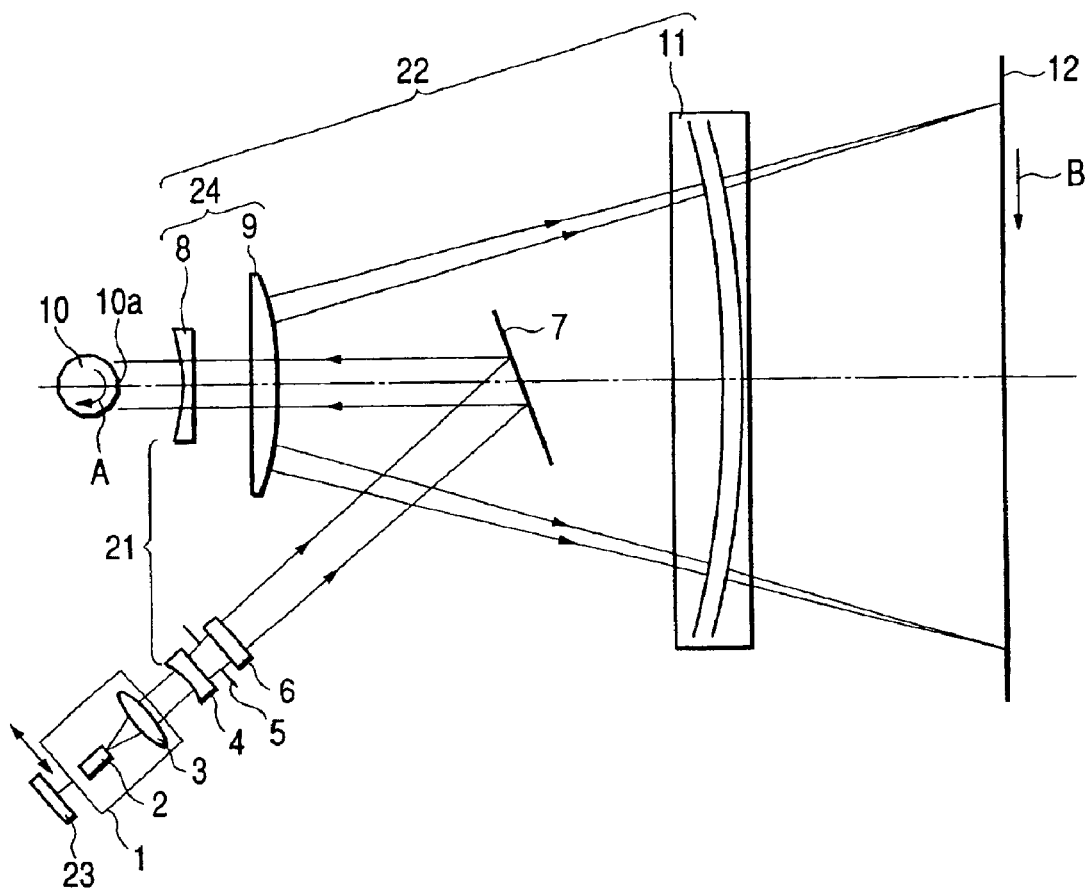
FIG. 1 is a main scanning sectional view of the first embodiment of the present invention.
Figure 2:
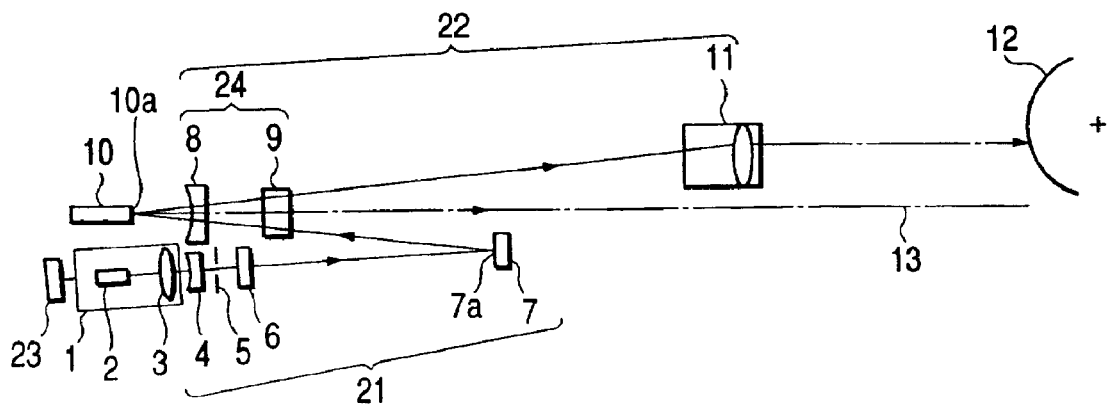
FIG. 2 is a sub-scanning sectional view of the first embodiment of the present invention.

FIG. 1 is a sectional view (main scanning cross-section) of the main part of the first embodiment of the present invention in the main scanning direction. FIG. 2 is a sectional view (sub-scanning cross-section) of the main part in the sub-scanning direction.

Note that in this specification, a plane which is perpendicular to the rotational axis of an optical deflector and includes a point on a deflecting surface at which a principal light beam is incident is defined as a main scanning cross-section, and a plane perpendicular to the main scanning cross-section is defined as a sub-scanning cross-section.

Referring to FIGS. 1 and 2, a laser unit 1 has a light source 2 formed by a semiconductor laser and a collimator lens 3. The laser unit 1 emits a substantially parallel light beam upon predetermined optical adjustment. The laser unit 1 in this embodiment is configured to be shifted by a shift adjusting means 23 in the main scanning direction with respect to the optical axis of an incident optical system 21 so as to be subjected to initial adjustment such that the illuminance distribution of scanning lines on a scanned surface 12 becomes almost symmetrical about the scanning central axis.

A divergent lens (negative lens) 4 has a negative refracting power and converts the substantially parallel light beam from the collimator lens 3 into a slightly divergent light beam. A stop plate (aperture stop) 5 restricts a passing light beam to shape the beam. A cylindrical lens 6 has a predetermined refracting power only in the sub-scanning direction, and forms a light beam passing through the stop plate 5 into an almost linear image on a deflecting surface (reflecting surface) 10a of an optical deflector 10 (to be described later) in a sub-scanning cross-section. A return mirror 7 reflects the light beam emerging from the laser unit 1 toward the optical deflector 10.

Note that each of the divergent lens 4, stop plate 5, cylindrical lens 6, return mirror 7, scanning lenses 8 and 9 (to be described later), and the like forms one element of the incident optical system 21.

The optical deflector 10 is a polygon mirror (rotary polyhedral mirror), which is rotated at a constant speed in the direction indicated by an arrow A in FIG. 1 by a driving means (not shown) such as a motor.

An imaging optical system 22 has f-θ characteristics and imaging ability. The imaging optical system 22 includes a scanning lens system (f-θ lens system) 24 having the first and second scanning lenses 8 and 9 with predetermined powers in the main scanning direction and a long cylindrical lens (long lens) 11 having a predetermined power in only the sub-scanning direction. The imaging optical system 22 forms a light beam deflected by the optical deflector 10 into an image on the scanned surface 12, and makes the deflecting surface 10a of the optical deflector 10 and scanned surface 12 substantially optically conjugate to each other in a sub-scanning cross-section to correct a tilt of the deflecting surface. The long lens 11 changes the refracting power in a sub-scanning cross-section in the longitudinal direction of the lens to keep a spot diameter and curvature of field on the scanned surface 12 in the sub-scanning direction constant. The long lens 11 is formed by molding plastic to acquire a required shape. Since the long lens 11 needs no refracting power in the main scanning direction, the two surfaces have the same radius of curvature to let the lens have a shape with a uniform thickness.

The scanned surface 12 is a photosensitive drum surface.

This embodiment is configured such that when the optical axes of the incident optical system 21 and imaging optical system 22 are projected on a main scanning cross-section, the optical axes almost coincide with each other. That is, the respective elements of the optical systems are configured to make a light beam emerging from the incident optical system 21 strike the deflecting surface 10a from the center or substantially the center of the deflection angle for the optical deflector 10 in a main scanning cross-section.

In this embodiment, the optically modulated light beam emitted from the semiconductor laser 2 is converted into a substantially parallel light beam by the collimator lens 3. This light beam is converted into a slightly divergent light beam by the divergent lens 4 and strikes the cylindrical lens 6 after being restricted by the stop plate 5. In a sub-scanning cross-section, the slightly divergent light beam incident on the cylindrical lens 6 converges, passes through the second and first scanning lenses 9 and 8 through the return mirror 7, strikes the deflecting surface 10a of the optical deflector 10, and is formed into an almost linear image (a linear image elongated in the main scanning direction) near the deflecting surface 10a. In this case, the light beam to be incident on the deflecting surface 10a is inclined with respect to a plane (a rotating plane of the optical deflector) perpendicular to the rotational axis of the optical deflector 10 by a predetermined angle within a sub-scanning cross-section including the rotational axis of the optical deflector 10 and the optical axis of the imaging optical system 22 (oblique incident optical system). In a main scanning cross-section, the light beam is transmitted through the second and first scanning lenses 9 and 8 through the return mirror 7 without any change to be converted into a substantially parallel light beam, and strikes the deflecting surface 10a from the center or substantially the center of the deflection angle for the optical deflector 10 (frontal incidence). The width of the substantially parallel light beam in this case is set to be sufficiently larger than the facet width of the deflecting surface 10a of the optical deflector 10 in the main scanning direction (over-field optical system).

The light beam reflected/deflected by the deflecting surface 10a of the optical deflector 10 is guided onto the photosensitive drum surface 12 through the first and second scanning lenses 8 and 9 and long lens 11. By rotating the optical deflector 10 in the direction indicated by the arrow A, the light beam is scanned on the photosensitive drum surface 12 in the direction indicated by an arrow B (main scanning direction).

In this embodiment, as shown in FIG. 2, the optical components ranging from the laser unit 1 to the cylindrical lens 6 are arranged on the same optical axis, and the optical axis is set at a predetermined angle with respect to a plane 13 nearly perpendicular to the deflecting surface 10a of the optical deflector 10. A mirror surface 7a of the return mirror 7 is placed in a direction perpendicular to the plane 13 to allow a light beam reflected by the return mirror 7, incident on the optical deflector with a predetermined angle being maintained, and reflected/deflected to separate from the return mirror 7 after being transmitted through the first and second scanning lenses 8 and 9.

Figure 3A:
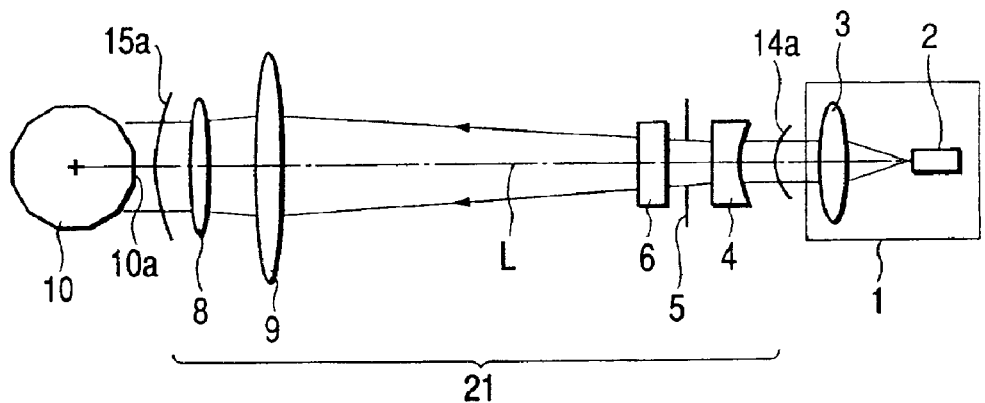
FIGS. 3A, 3B, and 3C are views showing the relationship between the tilt of a semiconductor laser chip and the shift of a laser unit.
Figure 3B:
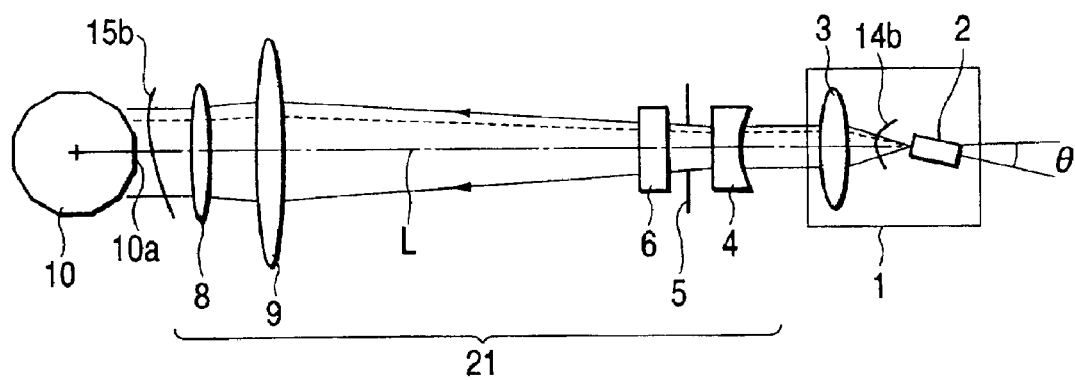
Figure 3C:
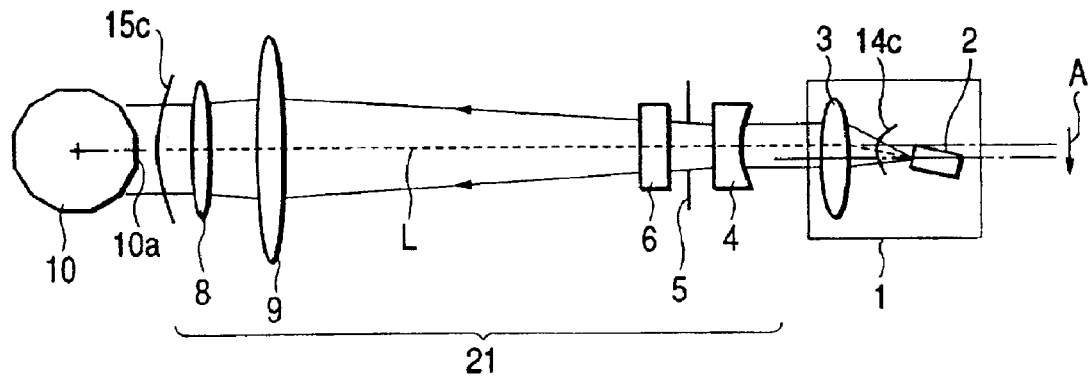

FIGS. 3A, 3B, and 3C are sectional views (main scanning sectional views), each showing the main part of this embodiment, ranging from the laser unit 1 to the optical deflector 10, and indicating the relationship between the tilt of the semiconductor laser chip and the shift of the laser unit.

FIG. 3A shows an ideal state wherein the chip of the semiconductor laser 2 has no tilt. Referring to FIG. 3A, the center of a light beam emitting from the laser unit 1 coincides with the optical axis L of the incident optical system. That is, the peak (center) of the intensity distribution of the light beam almost coincides with the center of the stop plate 5. In this state, an intensity distribution 14a of the light beam immediately after it is emerging from the laser unit 1 and an intensity distribution 15a of the light beam immediately before it is incident on the optical deflector 10 are symmetrical about the optical axis L of the incident optical system 21. Therefore, an illuminance distribution obtained when scanning lines are scanned on the scanned surface is symmetrical about the axis, and the illuminance distribution difference is small.

FIG. 3B shows a state wherein the chip of the semiconductor laser 2 is mounted at a tilt angle θ with respect to the optical axis L due to variations in components, assembly error, and the like. Referring to FIG. 3B, since the peak of an intensity distribution 14b of a light beam emitted from the semiconductor laser 2 does not pass through the center of the stop plate 5, the light beam is incident on the optical deflector 10 with an intensity distribution 15b asymmetrical about the optical axis L, as show in FIG. 3B. As a consequence, an asymmetrical illuminance distribution is formed on the scanned surface, and a larger illuminance distribution difference is produced.

FIG. 3C shows measures against the above situation in this embodiment. Referring to FIG. 3C, a shift adjusting means (not shown) translates the laser unit 1 in the state shown in FIG. 3B within the drawing surface by a predetermined amount ΔY in the main scanning direction (vertical direction) indicated by an arrow A with respect to the optical axis L. This makes it possible to make the center of an intensity distribution 14c of the light beam emitted from the semiconductor laser 2 coincide with substantially the center of the stop plate 5. As a consequence, an intensity distribution 15c of a light beam immediately before it is incident on the optical deflector 10 can restored to the state shown in FIG. 3A. At this time, therefore, the illuminance distribution on the scanned surface becomes almost symmetrical about the axis. Note that the expression "almost symmetrical" indicates that the illuminance distribution on the scanned surface falls within ±5% with respect to the axis in the effective scanning range.

As described above, in this embodiment, the laser unit 1 is configured to be shifted by the shift adjusting means 23 in the main scanning direction with respect to the optical axis L of the incident optical system 21 so as to make the illuminance distribution, obtained when the scanned surface 12 is scanned with scanning lines, become almost symmetrical about the scanning central axis, thereby reducing the asymmetry of the illuminance distribution, obtained when the scanned surface is scanned with scanning lines, due to variations in components, assembly error, and the like. This makes it possible to obtain a high-quality image. In addition, in this embodiment, since the laser unit 1 formed by integrating the light source 2 and collimator lens 3 can be shifted in the main scanning direction, the illuminance distribution on the scanned surface can be easily adjusted. As long as the shift adjusting means 23 is integral with the laser unit 1 and allows initial adjustment, effects similar to those described above can be obtained.

In this embodiment, the laser unit 1 is configured to be shifted in the main scanning direction with respect to the optical axis L of the incident optical system 21. However, the present invention is not limited to this, and the laser unit 1 may be configured to be shifted in the sub-scanning direction. If this unit is configured to be shifted in the sub-scanning direction, the use efficiency of light improves with respect to a tilt in this direction, thus improving the reliability of the laser.

In the present invention, since the laser unit 1 formed by integrating the light source 2 and collimator lens 3 is shifted in a predetermined direction, and the optical axis of the semiconductor laser 2 coincides with that of the collimator lens 3, the parallel light beam emerging from the collimator lens 3 emerges parallel with the optical axis of the collimator lens. No focus error therefore occurs. Furthermore, since the laser unit 1 is formed by integrating the light source 2 and collimator lens 3, when the light source 2 fails, the laser unit 1 may be replaced with another. This makes it possible to reduce the cost in terms of market serviceability.

[Second Embodiment]

Figure 4:
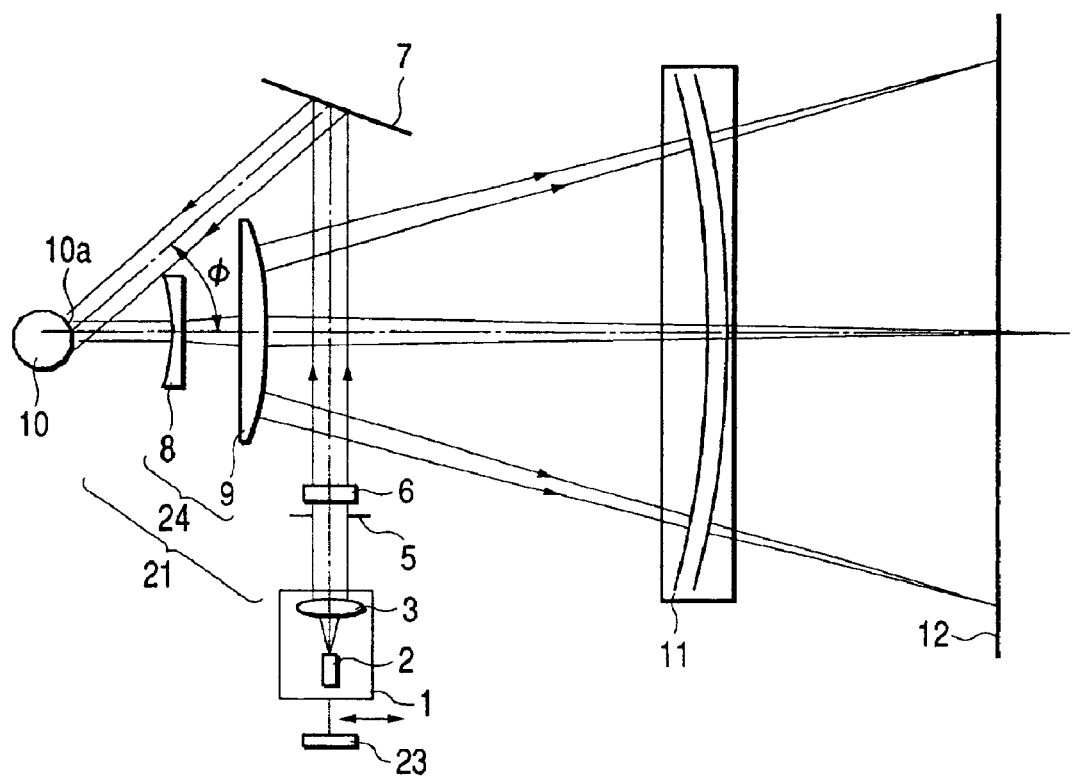
FIG. 4 is a main scanning sectional view of the second embodiment of the present invention.
Figure 5:
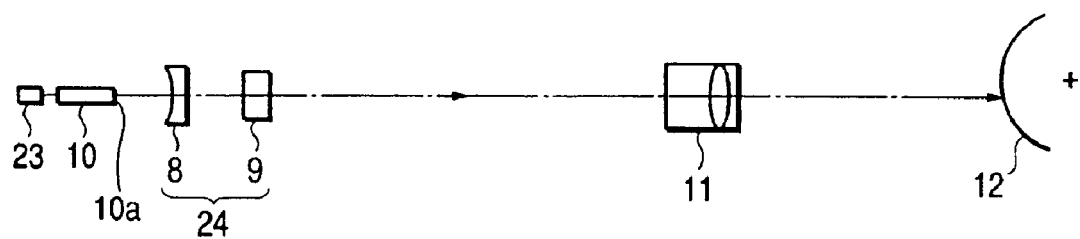
FIG. 5 is a sub-scanning sectional view of the second embodiment of the present invention.

FIG. 4 is a sectional view (main scanning sectional view) of the main part of the second embodiment of the present invention in the main scanning direction. FIG. 5 is a sectional view (sub-scanning sectional view) of the main part in FIG. 4 in the sub-scanning direction. The same reference numerals as in FIGS. 1 and 2 denote the same parts in FIGS. 4 and 5.

This embodiment differs from the first embodiment describe above in that a light beam emerging from an incident optical system 21 is obliquely incident on a deflecting surface 10a of an optical deflector 10 within a main scanning cross-section, and the incident optical system 21 is placed in a reflecting/deflecting (deflection scanning) plane based on the optical deflector 10. Other arrangements and optical functions are substantially the same as those in the first embodiment, and hence similar effects are obtained.

Since the optical axis of the incident optical system 21 in this embodiment is located in the same drawing surface (main scanning cross-section) like the optical axis of a scanning lens system 24, the light beam emerging from a laser unit 1 is made to strike the optical deflector 10 at an angle φ within the drawing surface so as not to interfere with the scanning lens system 24. In this arrangement, even if the chip of a semiconductor laser 2 is not tilted, since the position of a light beam cut by the deflecting surface 10a of the optical deflector 10 becomes an asymmetrical position with respect to an intensity distribution, the illuminance distribution of a spot imaged on a scanned surface 12 becomes asymmetrical.

In this embodiment, the laser unit 1 is placed to be shifted in advance in the main scanning direction (vertical direction) with respect to the optical axis of the incident optical system 21 by a predetermined amount corresponding to the angle φ to cancel out the asymmetry of the above illuminance distribution. In addition, even if the chip of the semiconductor laser 2 is tilted, the intensity distribution of a light beam immediately before it is incident on the optical deflector 10 can be adjusted to become almost symmetrical by adjusting the shift amount of the laser unit 1 in the main scanning direction in addition to the above means.

In this embodiment, the incident optical system 21 is formed by using a return mirror 7. However, the present invention is not limited to this, and can also be applied to an incident optical system without the return mirror as in the second embodiment.

[Third Embodiment]

The third embodiment of the present invention will be described next.

This embodiment differs from the first embodiment described above in that a laser unit is shifted by a shift adjusting means in the main scanning direction (vertical direction) with respect to the optical axis of an incident optical system such that the ratio of the intensities of two light beams obtained by splitting a light beam passing through a stop plate in two at the stop center in the main scanning direction becomes 10% or less. Other arrangements and optical functions are substantially the same as those in the first embodiment, and hence similar effects are obtained.

To reduce the asymmetry of an illuminance distribution on a scanned surface due to variations in components, assembly errors, and the like, the ratio of the light intensities of light beams passing through the stop plate in the main scanning direction must be set to 10% or less. In this embodiment, therefore, in consideration of parameters, e.g., a stop diameter w, a focal length f of a collimator lens, and an exit angle θ of a light beam from the semiconductor laser, the laser unit is shifted by the shift adjusting means in the main scanning direction with respect to the optical axis of the incident optical system to reduce the asymmetry of an illuminance distribution, obtained when the scanned surface is scanned with scanning lines, due to variations in components, assembly errors, and the like.

[Fourth Embodiment]

The fourth embodiment of the present invention will be described next.

This embodiment differs from the first embodiment described above in that a semiconductor laser and collimator lens are integrated into a chip such that the tilt angle of the chip in the main scanning direction of the semiconductor laser is set to ±2.5° or less with respect to the optical axis of the collimator lens. Other arrangements and optical functions are substantially the same as those in the first embodiment, and hence similar effects are obtained.

The reason why the tilt angle of the chip in the main scanning direction of the semiconductor laser is set to ±2.5° or less with respect to the optical axis of the collimator lens will be described below.

Letting f be the focal length of the collimator lens and θ be the tilt angle of the chip in the main scanning direction, a shift amount L of the laser unit which is required to obtain a symmetrical intensity distribution is given by L=f·tan θ. If f=35.2 (mm), θ=2.5°, and the stop diameter is 4.2 (mm), then L=1.53 (mm). To make a light beam emerge from the laser unit with a beam size large enough to stay within the stop diameter even if the laser unit is shifted by 1.54 (mm), at least a beam diameter of 4.2 (mm)+3.06 (mm)=7.26 (mm) is required. In consideration of the effective diameter of the collimator lens, the receiving surface of a lens holding portion, and the like, the lens needs to have an outer size of 11 (mm). In this embodiment, therefore, the tilt angle of the semiconductor laser chip is set to ±2.5° or less with respect to the optical axis of the collimator lens, considering that as the chip tilts, the aperture of the lens increases to result in an increase in cost, and spherical aberration can be readily corrected, and that the tilt of the optical axis of the laser unit due to a shift must be suppressed.

According to this embodiment, this makes it possible to reduce the asymmetry of an illuminance distribution, obtained when the scanned surface is scanned with scanning lines, due to variations in components, assembly errors, and the like.

Note that the laser unit may be shifted in the main scanning direction or/and the sub-scanning direction with respect to the optical axis of the incident optical system as in the first embodiment.

Figure 6:
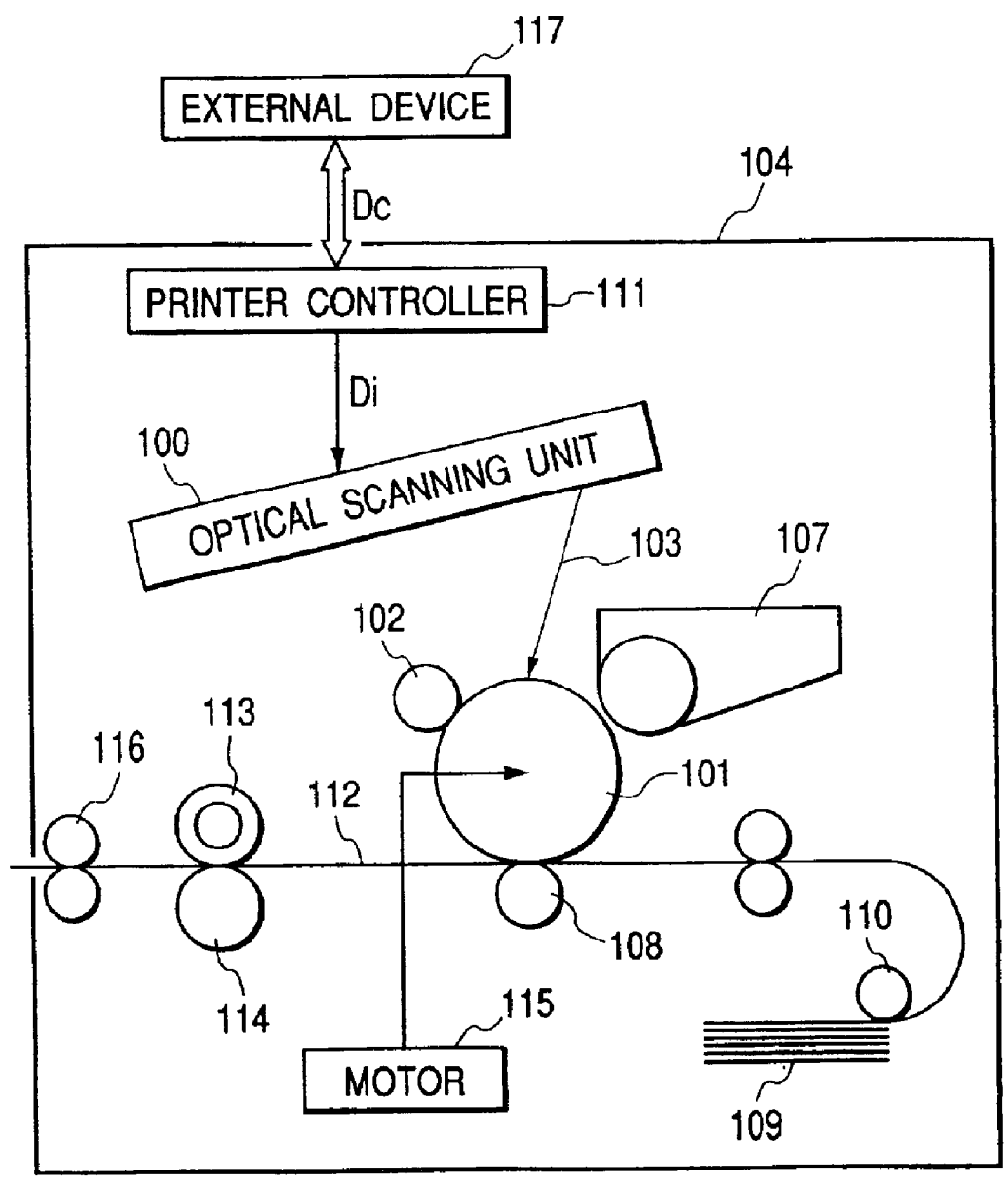
FIG. 6 is a view showing an image forming apparatus according to the present invention.

FIG. 6 is a sectional view of the main part of an image forming apparatus according to an embodiment of the present invention. Referring to FIG. 6, an image forming apparatus 104 receives code data Dc from an external device 117 such as a personal computer. This code data Dc is converted into image data (dot data) Di by a printer controller 111 in the apparatus. This image data Di is input to an optical scanning unit 100 having an arrangement like the one described in each of the first to fourth embodiments. A light beam 103 modulated in accordance with the image data Di emerges from the optical scanning unit 100, and the photosensitive surface of a photosensitive drum 101 is scanned in the main scanning direction with the light beam 103.

The photosensitive drum 101 serving as an electrostatic latent image carrier (photosensitive member) is rotated clockwise by a motor 115. Upon this rotation, the photosensitive surface of the photosensitive drum 101 moves with respect to the light beam 103 in the sub-scanning direction perpendicular to the main scanning direction. A charging roller 102 for uniformly charging the surface of the photosensitive drum 101 is placed above the photosensitive drum 101 such that the surface of the charging roller 102 is in contact with the photosensitive drum 101. The surface of the photosensitive drum 101 charged by the charging roller 102 is irradiated with the light beam 103 scanned by the optical scanning unit 100.

As described above, the light beam 103 is modulated on the basis of the image data Di. By irradiating the surface of the photosensitive drum 101 with the light beam 103, an electrostatic latent image is formed on the surface of the photosensitive drum 101. This electrostatic latent image is developed as a toner image by a developing unit 107 which is placed downstream from the radiation position of the light beam 103 in the rotational direction of the photosensitive drum 101 so as to be in contact with the photosensitive drum 101.

The toner image developed by the developing unit 107 is transferred onto a paper sheet 112 as a transfer medium by a transfer roller 108 placed below the photosensitive drum 101 to oppose the photosensitive drum 101. The paper sheet 112 is stored in a paper cassette 109 in front of the photosensitive drum 101 (on the right side in FIGS. 3A to 3C). However, a paper sheet can also be manually fed. A feed roller 110 is placed at an end portion of the paper cassette 109 to feed the paper sheet 112, stored in the paper cassette 109, onto a convey path.

The paper sheet 112 on which the unfixed toner image is transferred in the above manner is further conveyed to a fixing unit behind (the left side in FIG. 6) the photosensitive drum 101. The fixing unit is made up of a fixing roller 113 incorporating a fixing heater (not shown) and a press roller 114 which is pressed against the fixing roller 113. The fixing unit fixes the unfixed toner image on the paper sheet 112 conveyed from the transfer unit by heating the paper sheet 112 while pressing it between the fixing roller 113 and the pressing portion of the press roller 114. In addition, a paper discharge roller 116 is placed behind the fixing roller 113 to discharge the image-fixed paper sheet 112 outside the image forming apparatus.

Although not shown in FIG. 6, the printer controller 111 controls the respective components in the image forming apparatus, including the motor 115, and the polygon motor in the optical scanning unit (to be described later) as well as data conversion described above.

In the first to fourth embodiments, the semiconductor laser 2 is exemplified as a single-beam laser. However, the present invention can be applied to a multi-beam laser. More specifically, a monolithic multi-beam semiconductor laser can be used. The number of lasers is not limited to two, and may be three or more.

According to the present invention, as described above, there is provided an optical scanning apparatus, in which the laser unit is configured to be shifted by the shift adjusting means in a predetermined direction with respect to the optical axis of the incident optical system or/and the tilt angle of the semiconductor laser chip is set to fall within an allowable range so as to make an illuminance distribution, obtained when a scanned surface is scanned with scanning lines, almost symmetrical about the scanning center axis so that the asymmetry of an illuminance distribution, obtained when the scanned surface is scanned with scanning lines, due to variations in components, assembly errors, and the like can be reduced, thereby forming a high-quality image.

What is claimed is:

1. An optical scanning apparatus comprising:
   a laser unit having a laser source and an optical element configured to emit a substantially parallel beam of light;
   an incident optical system arranged to direct the light beam emerging from the laser unit to strike an optical deflector while maintaining a width of the light beam wider than a width of a deflecting surface of the optical deflector in a main scanning direction; and
   an imaging optical system for forming the light beam deflected by the optical deflector into an image on a scanned surface,
   wherein said laser unit is adapted to be moved in the main scanning direction without changing a direction of an optical axis of said incident optical system so as to make an illuminance distribution of scanning lines on the scanned surface become substantially symmetrical about a scanning central axis.

2. An optical scanning apparatus according to claim 1, wherein said laser unit is adapted to be moved by move adjusting means in the main scanning direction without moving in the direction of the optical axis of said incident optical system.

3. An apparatus according to claim 1, wherein the illuminance distribution on the scanned surface falls within ±5% with respect to the scanning central axis in an effective scanning range.

4. An apparatus according to claim 1, wherein when the optical axes of said incident optical system and imaging optical system are projected on a main scanning cross-section, the optical axes substantially coincide with each other.

5. An apparatus according to claim 4, wherein the light beam emerging from said incident optical system is obliquely incident on the deflecting surface of the optical deflector in a sub-scanning cross-section.

6. An apparatus according to claim 1, wherein the light beam emerging from said incident optical system is obliquely incident on the deflecting surface of the optical deflector in a main scanning cross-section.

7. An apparatus according to claim 6, wherein said laser unit is moved in advance in the main scanning direction with respect to the optical axis of said incident optical system by an amount corresponding to an incidence angle at which the light beam emerging from said incident optical system is obliquely incident on the deflecting surface of the optical deflector in a main scanning cross-section.

8. An apparatus according to claim 6, wherein said incident optical system is arranged in a main scanning cross-section based on the optical deflector.

9. An apparatus according to claim 1, wherein
   said incident optical system comprises a stop plate, and
   wherein said laser unit is moved in the main scanning direction without moving in the direction of the optical axis of said incident optical system such that a ratio of intensities of two light beams obtained by splitting a light beam passing through said stop plate in two in the main scanning direction at a stop center becomes not more than 10%.

10. An apparatus according to claim 1, wherein a tilt angle of the laser source in the main scanning direction is set to not more than ±2.5° with respect to the optical axis of the laser unit.

11. An image forming apparatus according to claim 1, wherein the main scanning direction, with respect to an optical axis of said incident optical system, is a direction that has a translational component.

12. An image forming apparatus according to claim 1, wherein the main scanning direction, with respect to an optical axis of said incident optical system, is a translational direction.

13. An image forming apparatus comprising:
   said optical scanning apparatus defined in any one of claims 1 to 3 and 4 to 7;
   a photosensitive member placed on the scanned surface;
   a developing unit for developing an electrostatic latent image formed on said photosensitive member by a light beam scanned by said optical scanning apparatus into a toner image;
   a transfer unit for transferring the developed toner image onto a transfer medium; and
   a fixing unit for fixing the transferred toner image on the transfer medium.

14. An image forming apparatus comprising:
   said optical scanning apparatus defined in any one of claims 1 to 3 and 4 to 7; and
   a controller for converting code data input from an external device into an image signal, and inputting the signal to said optical scanning apparatus.

15. An optical scanning apparatus comprising:
   a laser unit in which a light source and collimator lens are integrated;
   an incident optical system for making a light beam emerging from said laser unit strike an optical deflector while keeping the light beam wider than a width of a deflecting surface of the optical deflector in a main scanning direction; and
   an imaging optical system for forming the light beam reflected/deflected by the optical deflector into an image on a scanned surface,
   wherein said laser unit is adapted to be shifted by shift adjusting means in a predetermined direction with respect to the optical axis of said incident optical system so as to make an illuminance distribution of scanning lines on the scanned surface become substantially symmetrical about a scanning central axis.

16. An apparatus according to claim 15, wherein the illuminance distribution on the scanned surface falls within ±5% with respect to the scanning central axis in an effective scanning range.

17. An apparatus according to claim 15, wherein the predetermined direction is the main scanning direction or/and a sub-scanning direction.

18. An apparatus according to claim 15, wherein the light beam emerging from said laser unit is a substantially parallel light beam.

19. An apparatus according to claim 15, wherein when the optical axes of said incident optical system and imaging optical system are projected on a main scanning cross-section, the optical axes substantially coincide with each other.

20. An apparatus according to claim 19, wherein the light beam emerging from said incident optical system is obliquely incident on the deflecting surface of the optical deflector in a sub-scanning cross-section.

21. An apparatus according to claim 15, wherein the light beam emerging from said incident optical system is obliquely incident on the deflecting surface of the optical deflector in a main scanning cross-section.

22. An apparatus according to claim 21, wherein said incident optical system is arranged in a main scanning cross-section based on the optical deflector.

23. An apparatus according to claim 21, wherein said laser unit is shifted in advance in the main scanning direction with respect to the optical axis of said incident optical system by an amount corresponding to an incidence angle at which the light beam emerging from said incident optical system is obliquely incident on the deflecting surface of the optical deflector in a main scanning cross-section.

24. An apparatus according to claim 15, wherein said incident optical system comprises a stop, and said laser unit is shifted by said shift adjusting means in a predetermined direction with respect to the optical axis of said incident optical system such that a ratio of intensities of two light beams obtained by splitting a light beam passing through said stop plate in two in the main scanning direction at a stop center becomes not more than 10%.

25. An apparatus according to claim 15, wherein a tilt angle of the light source in the main scanning direction is set to not more than ±2.5° with respect to the optical axis of the collimator lens.

26. An image forming apparatus comprising:

said optical scanning apparatus defined in any one of claims 15 to 23;

a photosensitive member placed on the scanned surface;

a developing unit for developing an electrostatic latent image formed on said photosensitive member by a light beam scanned by said optical scanning apparatus into a toner image;

a transfer unit for transferring the developed toner image onto a transfer medium; and a fixing unit for fixing the transferred toner image on the transfer medium.

27. An image forming apparatus comprising:

said optical scanning apparatus defined in any one of claims 15 to 23; and a controller for converting code data input from an external device into an image signal, and inputting the signal to said optical scanning apparatus.

28. A method for performing optical scanning using an optical scanning apparatus including a laser unit in which a light source and collimator lens are integrated, an incident optical system for making a light beam emerging from the laser unit strike an optical deflector while keeping the light beam wider than a width of a deflecting surface of the optical deflector in a main scanning direction, and an imaging optical system for forming the light beam reflected/deflected by the optical deflector into an image on a scanned surface, comprising the step of:

shifting the laser unit in a predetermined direction with respect to the optical axis of the incident optical system so as to make an illuminance distribution of scanning lines on the scanned surface become substantially symmetrical about a scanning central axis.

29. A method according to claim 28, wherein the predetermined direction is the main scanning direction or/and a sub-scanning direction.

30. The method of claim 28, further comprising the step of providing a controller for converting code data input from an external device into an image signal and inputting the signal to the optical scanning apparatus.

31. A method for performing optical scanning using an optical scanning apparatus including a laser unit having a laser source and an optical element configured to emit a substantially parallel beam of light, an incident optical system arranged to direct the light beam emerging from the laser unit to strike an optical deflector while maintaining a width of the light beam wider than a width of a deflecting surface of the optical deflector in a main scanning direction, and an imaging optical system for forming the light beam deflected by the optical deflector into an image on a scanned surface, the method comprising the step of:

moving the laser unit in the main scanning direction without changing a direction of an optical axis of the incident optical system so as to make an illuminance distribution of scanning lines on the scanned surfae become substantially symmetrical about a scanning central axis.

32. The method according to claim 31, wherein said laser unit is adapted to be moved in the main scanning direction by move adjusting means without moving in a direction of an optical axis of the incident optical system.

33. The method according to claim 31, wherein the illuminance distribution on the scanned surface falls within ±5% with respect to the scanning central axis in an effective scanning range.

34. The method according to claim 31, wherein when the optical axes of the incident optical system and imaging optical system are projected on a main scanning cross-section, the optical axes substantially coincide with each other.

35. The method according to claim 34, wherein the light beam emerging from the incident optical system is obliquely incident on the deflecting surface of the optical deflector in a sub-scanning cross-section.

36. The method according to claim 31, wherein the light beam emerging from the incident optical system is obliquely incident on the deflecting surface of the optical deflector in a main scanning cross-section.

37. The method according to claim 36, wherein the incident optical system is arranged in a main scanning cross-section based on the optical deflector.

38. The method according to claim 36, wherein the laser unit is moved in advance in the main scanning direction with respect to the optical axis of the incident optical system by an amount corresponding to an incidence angle at which the light beam emerging from the incident optical system is obliquely incident on the deflecting surface of the optical deflector in a main scanning cross-section.

39. The method according to claim 31, wherein the incident optical system comprises a stop plate, and wherein the laser unit is moved in the main scanning direction without moving in the direction of the optical axis of the incident optical system such that a ratio of intensities of two light beams obtained by splitting a light beam passing through the stop plate in two in the main scanning direction at a stop center becomes not more than 10%.

40. The method according to claim 31, wherein a tilt angle of the laser source in the main scanning direction is set to not more than ±2.5° with respect to the optical axis of the laser unit.

41. An image forming method comprising the steps of:
the method for performing optical scanning according to any one of claims 31 to 33 and 34 to 38;
placing a photosensitive member on the scanned surface;
developing an electrostatic latent image formed on the photosensitive member by a light beam scanned by the optical scanning apparatus into a toner image;
transferring the developed toner image onto a transfer medium; and
fixing the transferred toner image on the transfer medium.

42. An image forming method comprising the steps of:
the method for performing optical scanning according to any one of claims 31 to 33 and 34 to 38;
converting code data input from an external device into an image signal; and
inputting the signal to the optical scanning apparatus.

* * * * *

UNITED STATES PATENT AND TRADEMARK OFFICE
CERTIFICATE OF CORRECTION

PATENT NO. : 7,057,632 B2
APPLICATION NO. : 09/729279
DATED : June 6, 2006
INVENTOR(S) : Takeshi Yamawaki et al.

It is certified that error appears in the above-identified patent and that said Letters Patent is hereby corrected as shown below:

ON COVER PAGE AT (56) U.S. PATENT DOCUMENTS

Insert: --5,982,508 A 11/1999 Kashihara--.

ON COVER PAGE AT (56) FOREIGN PATENT DOCUMENTS

"02219012 A" should read --2-219012 A--;
"11064759 A" should read --11-064759 A--; and
"11264952 A" should read --11-264952 A--.

COLUMN 2

Line 42, "lins," should read --lines--.

COLUMN 11

Line 29, "moving in the direction of the" should read --changing a direction of an--; and
Line 61, "moving in the direction of the" should read --changing a direction of an--.

COLUMN 12

Line 15, "claims 1 to 3 and 4 to 7;" should read --claims 1 to 10;--;
Line 27, "claims 1 to 3 and 4 to 7;" should read --claims 1 to 10;--; and
Line 45, "the" should read --an--.

COLUMN 13

Line 16, "stop," should read --stop plate,--.

COLUMN 14

Line 18, "surfae" should read --surface--;
Line 21, close right margin;
Line 24, "moving in" should read --changing--; and
Line 58, "moving in the direction of the" should read --changing a direction of an--.

UNITED STATES PATENT AND TRADEMARK OFFICE
CERTIFICATE OF CORRECTION

PATENT NO. : 7,057,632 B2
APPLICATION NO. : 09/729279
DATED : June 6, 2006
INVENTOR(S) : Takeshi Yamawaki et al.

It is certified that error appears in the above-identified patent and that said Letters Patent is hereby corrected as shown below:

COLUMN 15

Line 3, "claims 31 to 33 and 34 to 38;" should read --claims 31 to 40;--.

COLUMN 16

Line 4, "claims 31 to 33 and 34 to 38;" should read --claims 31 to 40;--.

Signed and Sealed this

Twelfth Day of June, 2007

JON W. DUDAS
*Director of the United States Patent and Trademark Office*